United States Patent [19] [11] 4,119,328
Rhodes [45] Oct. 10, 1978

[54] GOOSENECK TRAILER WITH ADJUSTABLE BOGIE

[76] Inventor: Charles Don Rhodes, P.O. Box B, Petersburg, Tex. 79250

[21] Appl. No.: 743,295

[22] Filed: Nov. 19, 1976

[51] Int. Cl.² .................. B62D 27/06; B62D 53/06
[52] U.S. Cl. .................. 280/415 B; 280/423 B; 280/80 B; 296/10
[58] Field of Search .......... 280/423 R, 423 B, 415 R, 280/415 A, 415 B, 491 A, 80 B, 81 R; 214/85; 296/35 A, 10

[56] References Cited

U.S. PATENT DOCUMENTS

| 2,391,948 | 1/1946 | Couse | 280/80 B |
|---|---|---|---|
| 2,966,274 | 12/1960 | Price | 214/85 |
| 3,021,155 | 2/1962 | Sherman | 280/81 R |
| 3,717,362 | 2/1973 | Johnson | 280/415 A |
| 3,733,089 | 5/1973 | Goecke | 280/423 R |
| 3,889,978 | 6/1975 | Kann | 280/423 R |
| 3,963,259 | 6/1976 | Massey | 280/80 B |

Primary Examiner—John A. Pekar
Attorney, Agent, or Firm—Wendell Coffee

[57] ABSTRACT

The bed of a gooseneck trailer is supported by two bogies, one on the right side of the trailer and one on the left. The gooseneck is angled forward to enable the trailer to be towed by numerous types of towing vehicles. The gooseneck is fitted with a plurality of telescoping inserts enabling the trailer to be towed by vehicles of differing heights and vehicles fitted with various means for attaching trailers. The bogies may be moved independently longitudinally of the trailer and locked into position to control the weight transferred to the towing vehicle.

16 Claims, 7 Drawing Figures

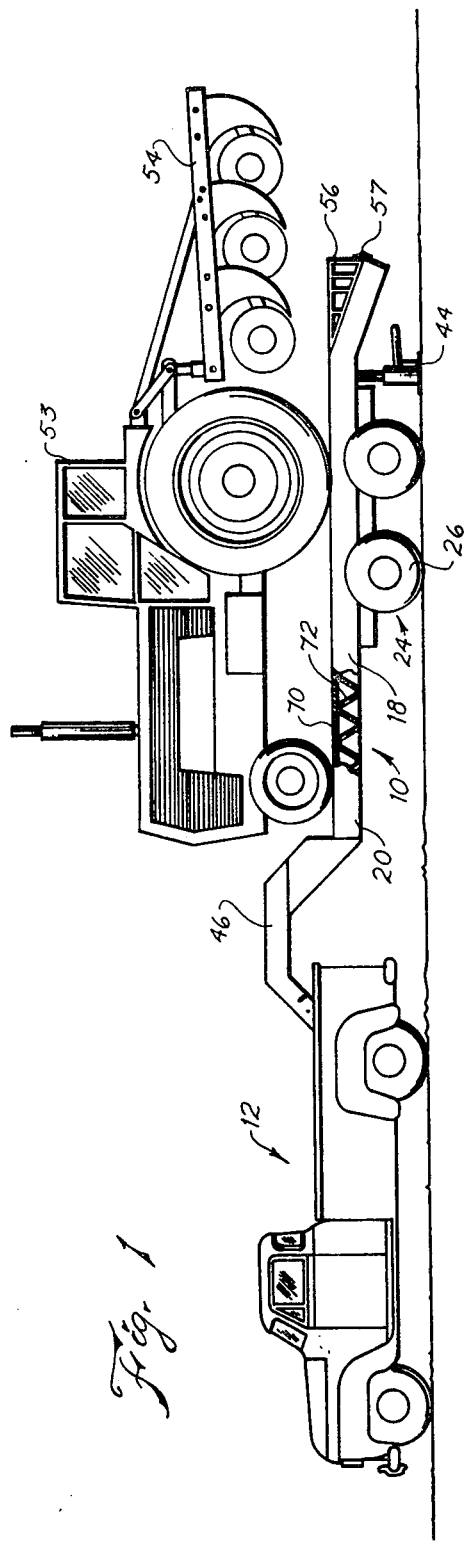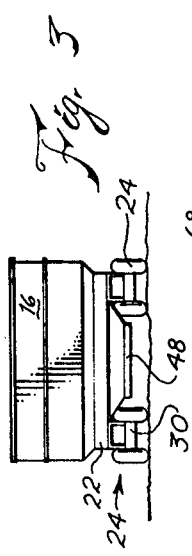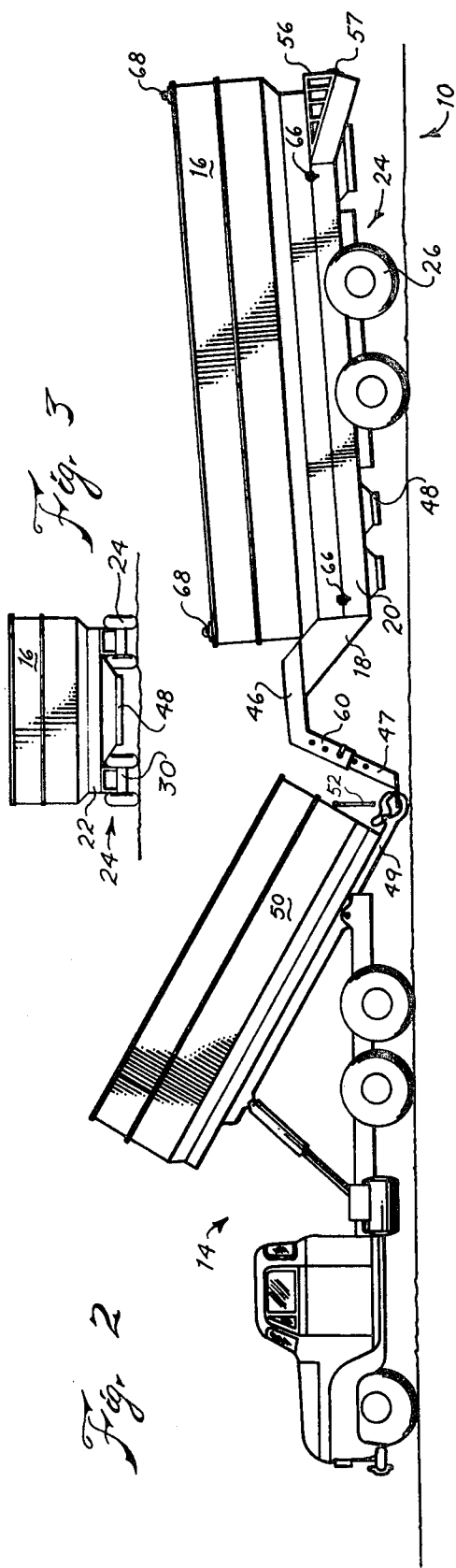

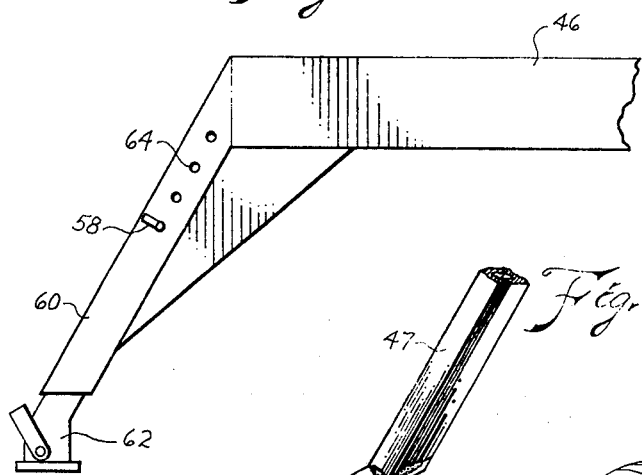
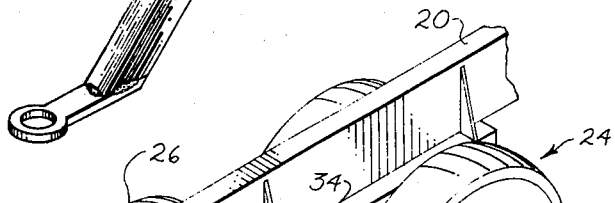
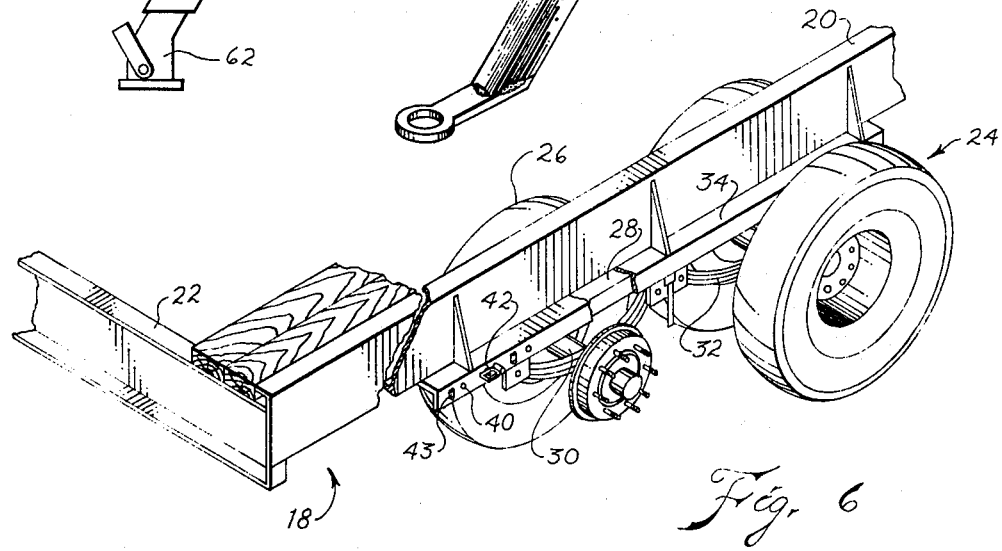
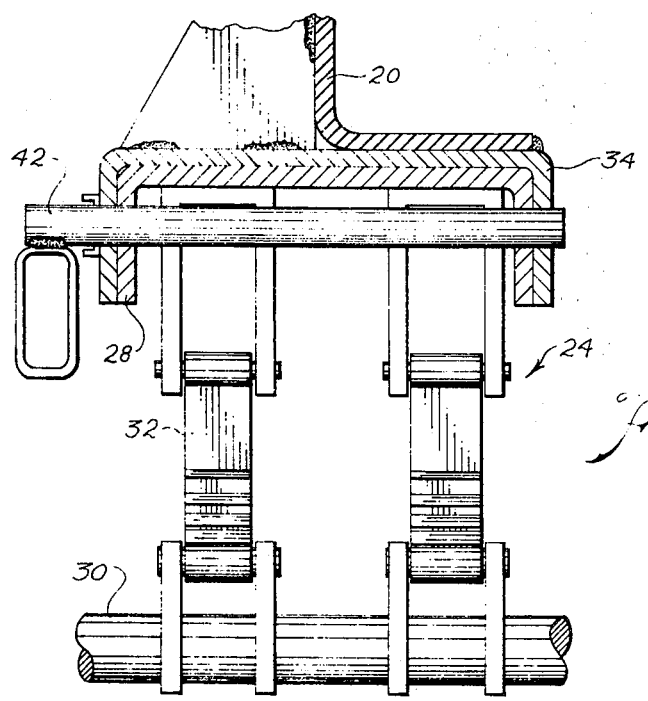

GOOSENECK TRAILER WITH ADJUSTABLE BOGIE

BACKGROUND OF THE INVENTION (1) Field of the Invention

This invention relates to trailers which are towed by another vehicle and used for transporting materials.

(2) Description of the Prior Art

Gooseneck trailers have long been used for transporting materials for agricultural and other purposes. These versatile trailers have been adapted to carry numerous types of materials by mounting various types of containers upon the trailers.

Methods for adapting a convertible hopper or a hopper like unit to a flatbed trailer are shown in the following U.S. patents:

Kaster: 2,768,021
Hicks: 3,037,807
Taylor: 3,266,836
Filter: 3,524,659

Various methods of adapting a longitudinally adjustible wheeled bogie unit to a trailer have been developed. Various methods for adapting a movable bogie to a trailer frame have been disclosed in the following U.S. patents:

Wolf: 2,682,419
Bennett: 2,831,735
Tantlinger: 3,085,816
Ginsburg: 3,365,211
Glassmeyer: 3,618,969

SCHMIDT, U.S. Pat. No. 3,080,191, discloses a method for securing such bogie units to a trailer body.

In each instance the bogie extends the full width of the body and the unit. These inventions have developed and refined the underlying concept of longitudinally moving a single bogie unit on a trailer body.

SUMMARY OF THE INVENTION (1) New and Different Function

I have discovered that two features, a longitudinally adjustable undercarriage and a telescoping gooseneck tongue angled forwardly and downwardly, may be combined to give a flatbed trailer the versatility required for many agricultural applications. The benefits gained from combining these two features are most remarkable.

A flatbed trailer is most useful in agricultural operations provided it can be towed smoothly, efficiently and safely behind all the vehicles commonly used on farms including various sizes of tractors, various sizes of pickup trucks, and various types or sizes of larger trucks including tiltbed dump trucks. Each type of towing vehicle will tow a trailer most smoothly, efficiently and safely when the proper proportion of the trailer weight is transferred to the towing vehicle. In addition, some towing vehicles require a minimum clearance between the towing vehicle and trailer. For example, tilt-bed dump trucks require a minimum of clearance between the body of the truck and the trailer to enable the truck to dump its load without disconnecting the trailer. By combining the telescoping gooseneck tongue angled forwardly and downwardly with a longitudinally adjustable undercarriage, I have produced an extraordinarily versatile trailer. The proportion of the trailer weight transferred to the towing vehicle may be varied by longitudinally adjusting the undercarriage along the trailer chassis. The telescoping gooseneck tongue may be extended or retracted to accommodate vehicles having hitches located at various heights above the ground. The tongue is angled forwardly and downwardly at such an angle that when the trailer is hitched to a dump truck and the dump truck is dumped, the tongue will not prevent the tailgate from opening wide enough to discharge the truck's cargo.

The trailer has removable floor sections and a removable hopper. When the floor sections have been removed, and the removable hopper installed, the trailer may be used to carry bulk solids such as grain. The trailer can then be towed behind a dump truck or other vehicle suitable for transporting bulk solids. This enables the farmer to virtually double the rate at which grain can be transported from the field to a storage or transshipment point without doubling his capital investment. Alternatively, the trailer may be towed behind a pickup truck. This permits the farmer to transport large amounts of grain with a pickup truck, a vehicle not in itself suitable for carrying bulk solids.

The trailer is also fitted with one or more ramps attached to the rear of the trailer by hinges. When the ramps are in the raised position, they rest flush with the remainder of the trailer floor. When the ramps are in the lowered position, they touch the ground and permit the loading of agricultural implements onto the trailer. The telescoping gooseneck permits vehicles having hitches at widely varying heights above the ground to be used for towing agricultural implements.

Further, I have found that by having the bogies independently mounted, they are much easier to move with the equipment the farmer will normally have available to him. It is possible to jack up one side of the trailer with an ordinary jack and roll the bogies longitudinally of the trailer and reconnect them in the desired positon; then, on the other side of the trailer, all that is necessary is to jack up that side of the trailer, roll the bogie to the new position and place pins through the channels to lock them in place.

Thus, with the novel combinations and new arrangements of parts, I have achieved a result through the combination which is far greater than the sum of the results of the individual components.

(2) Objects of the Invention

An object of this invention is to make a better trailer.

Another object is to produce a trailer capable of being towed behind numerous types of towing vehicles having hitch means located at varied heights above the ground.

Another object is to produce a trailer capable of varying the weight transferred to the towing vehicle.

Yet another object of the invention is to produce a trailer capable of transferring a constant weight to the towing vehicle under varying load distributions.

A further object is to produce a trailer having a removable grain hopper with discharge means located in the bottom of the hopper and an adjustable undercarriage such that the undercarriage may be adjusted along the longitudinal axis of the trailer without interference with the hopper discharge means.

Further objects are to achieve the above with a device that is sturdy, compact, durable, lightweight, simple, safe, efficient, versatile, and reliable, yet inexpensive and easy to manufacture, adjust, operate, and maintain.

Other objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a side elevation of a trailer according to this invention with a flat bed being towed behind a light truck, with parts broken away for clarity.

FIG. 2 is a side elevation of the trailer with hopper body hitched to a tilt-bed dump truck while the truck is dumping its load.

FIG. 3 is a rear elevational view of the trailer with a hopper body.

FIG. 4 is a side elevation of the adjustable gooseneck tongue with a ball socket hitch extension.

FIG. 5 is a perspective view of a portion of a gooseneck pintle eye or loop hitch extension.

FIG. 6 is a perspective view of the independent bogie attached to a portion of the chassis, with some parts removed and others broken away.

FIG. 7 is a sectional view of means for attaching the bogie to the chassis.

DESCRIPTION OF THE PREFERRED EMBODIMENT

Towed roadway vehicle 10, a trailer, is shown in FIG. 1 being towed behind light truck 12 a towing vehicle, commonly a one tone pickup truck. In FIG. 2, trailer 10 is shown being towed behind towing vehicle in the form of dump truck 14. Those skilled in the art will recognize that the light truck 12 is representative of a class of towing vehicles which tow most smoothly, efficiently and safely when approximately 500 kg to 3 tons of the trailers' gross weight is transferred to the light truck. If too little weight is transferred to the light truck 12, the light truck will ride rough and the trailer will pitch and whip excessively. However if too much weight is transferred to the light truck, the light truck will not drive properly.

On the other hand, when the trailer 10 is towed as a "pup" as in FIG. 2, the towing vehicle will operate most satisfactorily when only a minimal proportion of the trailer's gross weight, one to one-and-a-half tons, is transferred to the towing vehicle. If too much weight is transferred to the towing vehicle, the weight distribution of the towing vehicle will be affected, resulting in excessive weight on the towing vehicle's rear wheels and too little weight on the front wheels. In such a condition, the towing vehicle may not steer properly and its gross load or axle load limitations may be exceeded. If too little weight is transferred, then the trailer will pitch and whip excessively.

FIG. 2 shows the trailer 10 with removable hopper 16 mounted on chassis 18 formed by longitudinal chassis members 20 and traverse members 22. At least two independent bogies 24 having a plurality of ground engaging wheels 26 form an undercarriage. The bogies shown here are equipped with pneumatic tires as ground engaging wheels.

Each of the bogies 24 has longitudinal bogie frame member 28. Short axle 30 is attached to the bogie frame member 28 by spring 32, shown here as a pair of leaf springs. Those skilled in the art will recognize that numerous other types of spring suspensions which form means to connect the wheels could be adapted to this invention. The pair of ground engaging wheels 26 are mounted on the short axle 30. These ground engaging wheels straddle bogie frame member 28.

Bogie frame member 28 is a channel shaped member slidingly mated to channel shaped chassis coupling member 34 which is affixed to longitudinal chassis member 20 as by welding or any other convenient method. The members 28 and 34 conform in size and shape. A locking means comprising apertures 40 in the couplng member 34, correlative apertures located in the bogie frame member 28, and locking pin 42. The locking means permits the bogie 24 to be locked in a series of positions along the longitudinal chassis member 20. As the bogie is moved toward the towing vehicle, the proportion of the trailer weight transferred to the towing vehicle is reduced. As the bogie is moved away from the towing vehicle, the proportion of the trailer weight transferred to the towing vehicle is increased. The number of apertures and the spacing between the apertures will govern the range through which the proportion of weight transferred to the towing vehicle may be varied.

If the apertures in the coupling member 34 are spaced at proportionately greater or lesser intervals than the intervals between the apertures in the bogie frame member 28, the weight transferred to the towing vehicle may be varied in finer gradations. Those skilled in the art will realize that the number, spacing and location of the apertures will depend upon the designed gross weight of the trailer. Through experience, I have found that three apertures spaced so as to transfer 8%, 12% and 18% of the trailer's gross vehicle weight to the towing vehicle are satisfactory for a trailer designed to have a fully loaded gross vehicle weight of 11,000 kg.

The procedure for adjusting the bogies is as follows: first, locking pin 42 is re removed, thus detaching the bogie from the chassis; then, jack 44 is inserted under the longitudinal chassis member. After the chassis is raised off the bogie by means of the jack, the bogie 24 is pushed until it is in the desired location. Aperture 40 in bogie frame member 28 is aligned with the desired aperture in the coupling member 34. The locking pin 42 is then inserted in the proper aperture, thus reattaching the bogie to the chassis and finally the jack 44 is removed. The above sequence is repeated to adjust the opposite bogie. Clip 43 on the coupling member retains the pin 42 in place.

FIG. 2 illustrates the way in which the angled gooseneck 46 acts in conjunction with the adjustable bogies to increase the versatility of the trailer. Once the bogies 24 have been adjusted to the minimum weight transfer position as described above, the vehicle can be disconnected from the towing vehicle and connected to a dump truck 14 which has low hitch platform 49. Ball socket extension 62 is changed to pintle eye extension 47 upon this change. When both the dump truck 14 and the removable hopper 16 have been filled with grain or other product to be transported, they are driven to the unloading site. The hopper 16 is first emptied by discharge spout 48, a sliding plate operated by mechanical gearing, rack and pinion or similar means. When the trailer has been emptied, the dump truck may then enter its hopper 50 without disconnecting the trailer 10. When the dump truck hopper 50 is raised to its uppermost position, the angled gooseneck 46 will be forced almost to the ground and the rear wheels of the bogie 24 will be raised slightly off the ground. The pintle eye extension 47 will permit the extreme angle between the two halves of the hitch, one-half being attached to the truck hopper 50 and the other being a portion of the pintle eye extension 47. Although the rear door 52 of the dump truck hopper 50 will be swung toward the angled gooseneck 46, the angle of the gooseneck is such that the door will be able to open wide enough to permit the dump truck hopper 50 to be efficiently dumped.

FIG. 1 illustrates how the adjustable angled gooseneck 46 works in conjunction with the adjustable bogies 24 to allow various vehicles to be loaded aboard the trailer 10 and towed safely, efficiently and smoothly behind vehicles having hitch means located at various heights above the ground. To load a vehicle 53, wedge-shaped ramps 56 are first lowered by pivoting them about hinge 57. If the ramps do not touch ground or the trailer is not level, latch pin 58 is removed from the angled gooseneck. (FIG. 4). Gooseneck outer member 60 is attached to the trailer chassis 18. The outer member 60 is moved axially with respect to gooseneck inner member of extension 62, which has ball socket hitch and is fixed in the pickup bed. The pickup bed is a high hitch platform. When aperture 64 in the outer member 60 is aligned with an aperture in the inner member 62, the ramp members 56 touch the ground and trailer chassis 18 is as nearly level as practicable, the latch pin 58 is inserted into the proper aperature 64. At this point, a vehicle 53 may be driven onto the trailer chassis. It is desirable to have the proper tongue weight. The driver will adjust the bogies 24 by the procedure outlined above to achieve the proper weight. The driver will then load the vehicle 53 onto the trailer chassis.

Often the vehicle or tractor 53 will be of such shape and size that its center of gravity will not be located over the center of the chassis 18. If the center of gravity of the vehicle or tractor 53 is located behind the bogies 24 when loaded, the chassis 18 and angled gooseneck 46 will act as a lever, the bogies 24 will act as the fulcrum and the weight of the vehicle will lift the towing vehicle. This condition is unsafe. My invention overcomes this difficulty. The bogies 24 can be adjusted away from the towing vehicle until they are positioned slightly behind the center of gravity of the vehicle to give the proper tongue weight. The bogies are normally positioned before the vehicle is driven onto the chassis 18. In agricultural operations this feature enables the farmer to load and transport a large tractor having a heavy implement 54 attached behind without first removing the heavy implement.

FIG. 2 shows the trailer 10 with the removable hopper 16 installed. The spouts 48 on the removable hopper 16 extend below the longitudinal bogie frame members approximately even with the short axles 30. To remove this hopper, the trailer is first driven under a lifting device. Bolts 66 which fasten the hopper to the chassis 18 are removed. The lifting device is attached to four lifting dogs 68, one located at each corner of the hopper 16 and the removable hopper 16 is lifted clear of the chassis. The trailer 10 is then driven away from the lifting device and the hopper 16 may be stored in any convenient manner. Removable floor sections 70 may be installed if a flat bed is desired. The removable floor sections engage brackets 72 attached to the longitudinal and transverse chassis members.

As an aid to correlating the terms of the claims to the exemplary drawing, the following catalog of elements is provided:

| | |
|---|---|
| 10 towed vehicle | 46 angled gooseneck |
| 12 light truck | 47 pintle eye extension |
| 14 dump truck | 48 discharge spout |
| 16 removable hopper | 49 low hitch platform |
| 18 chassis | 50 dump truck hopper |
| 20 long. chassis mbrs. | 52 rear door |
| | 53 tractor |
| 22 transv. chas. mbrs. | 54 implement |
| 24 bogies | 56 ranp |
| 26 wheels | 57 hinge |
| 28 bogie frame mbr. | 58 latch pin |
| 30 short axle | 60 gooseneck outer mbr. |
| 32 spring | 62 gooseneck inner mbr. |
| 34 chassis coupling mbr. | 64 apertures |
| | 66 bolts |
| 40 apertures | 68 lifting dogs |
| 42 locking pin | 70 floor sections |
| 43 clip | 72 brackets |
| 44 jack | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a trailer having
   a rectangular horizontally disposed rigid chassis including
      (i) longitudinal chassis members, and
      (ii) transverse chassis members,
   hitch means connected to the chassis for connecting the trailer to a towing vehicle,
   a plurality of ground engaging wheels,
the improved structure for attaching said wheels to said chassis comprising in combination with the above:
   two independent bogies, each having
      (i) a longitudinal bogie frame member,
      (ii) at least one short axle,
      (iii) a pair of said ground engaging wheels on said short axle, and
      (iv) a spring means for connecting the axle to the bogie frame member, with
      (v) the wheels straddling the bogie frame member,
   each of said bogie frame members adjustably attached to one of said longitudinal chassis members as follows:
   a coupling member affixed to the longitudinal chassis member,
   said bogie frame member is slidingly mated to said coupling member,
   at least one aperture in said bogie frame member,
   a plurality of apertures in said coupling member, and
   a locking pin through said bogie frame member aperture.

2. The invention as defined in claim 1 with additional limitations of
   at least one wedge-shaped ramp, and
   hinge means for attaching said wedge-shaped ramp to the rear of said chassis whereby the wedge-shaped ramp may be
      (i) lowered to the ground or
      (ii) raised and stowed level with the top of the chassis.

3. The invention as defined in claim 1 wherein each bogie has at least two of said short axles.

4. The invention as defined in claim 3 with additional limitations of
at least one wedge-shaped ramp, and
hinge means for attaching said wedge-shaped ramp to the rear of said chassis whereby the wedge-shaped ramp may be
(i) lowered to the ground or
(ii) raised and stowed level with the top of the chassis.

5. The invention as defined in claim 4 with additional limitations of
a removable floor which may be installed upon said chassis,
said removable floor providing means for permitting a load on the chassis to extend vertically below said longitudinal bogie frame members.

6. In a trailer having
a rectangular horizontally disposed rigid trailer chassis having longitudinal chassis members and transverse chassis members,
at least one undercarriage member having a plurality of ground engaging wheels and
a hopper body mounted on the chassis;
the improved structure comprising in combination:
a telescoping gooseneck tongue having
(i) an outer member connected to the trailer chassis sloping forward and downward from the highest point of said outer member,
(ii) at least two inner members, each of which is capable of exclusively sliding longitudinally within said outer member and being removed from the outer member,
(iii) locking means for fixing either of the inner members exclusively in a selected fixed position with respect to the outer member, and
(iv) hitch connection means for connecting the trailer to a towing vehicle affixed to each inner member,
(v) each inner member having hitch means of a different category from the other inner members, and
said undercarriage member attached longitudinally adjustably upon one of the longitudinal chassis members,
said hopper being removable,
a removable floor which may be installed upon said chassis when said removable hopper has been removed,
said removable floor providing means for permitting said removable hopper to extend vertically below said longitudinal chassis frame members.

7. The invention as defined in claim 6 with additional limitations of
at least one wedge-shaped ramp, and
hinge means for attaching said wedge-shaped ramp to the rear of said chassis whereby the wedge-shaped ramp may be
(i) lowered to the ground or
(ii) raised and stowed level with the top of the chassis.

8. The invention as defined in claim 6 with additional limitations of
said undercarriage comprising in combination two independent bogies, each bogie having
(i) a longitudinal bogie frame member,
(ii) at least one short axle,
(iii) a pair of said wheels mounted on said short axle,
(iv) a spring means for connecting said axle to the bogie frame member, with
(v) the wheels straddling the bogie frame member,
said independent bogie in combination with said telescoping gooseneck tongue providing means for adjusting the trailer for towing vehicles with hitches of varying heights and with varying load capacities.

9. The invention as defined in claim 6 wherein
each bogie has at least two of said short axles.

10. The invention as defined in claim 9 with additional limitations of
each of said bogies is attached longitudinally adjustably upon one of the longitudinal chassis members by means comprising in combination:
(i) a coupling member affixed to said longitudinal chassis member,
(ii) said bogie frame member is slidingly mated to said coupling member,
(iii) at least one aperture in said bogie frame member,
(iv) a plurality of apertures in the coupling member, and
(v) a locking pin in said apertures.

11. The invention as defined in claim 10 with additional limitations of
at least one wedge-shaped ramp, and
hinge means for attaching said wedge-shaped ramp to the rear of said chassis whereby the wedge-shaped ramp may be
(i) lowered to the ground or
(ii) raised and stowed level with the top of the chassis.

12. In a trailer having
a rectangular horizontally disposed rigid chassis including
(i) longitudinal chassis members, and
(ii) transverse chassis members,
hitch means connected to the chassis for connecting the trailer to a towing vehicle,
a plurality of ground engaging wheels,
the improved structure for attaching said wheels to said chassis comprising in combination with the above:
two independent bogies, each having
(i) a longitudinal bogie frame member,
(ii) at least one short axle,
(iii) a pair of said ground engaging wheels on said short axle, and
(iv) a spring means for connecting the axle to the bogie frame member, with
(v) the wheels straddling the bogie frame member,
each of said bogie frame members adjustably attached to one of said longitudinal chassis members,
a removable floor installed upon said chassis,
said removable floor providing means for permitting a load on the chassis to extend vertically below said longitudinal bogie frame members.

13. The improved method of adapting a trailer to be towed by different types of towing vehicles, said trailer having a rigid horizontally disposed rectangular trailer chassis with longitudinal chassis members and transverse chassis members, at least one adjustable undercarriage member having wheels,
a first inner member telescoped and adapted to be locked into
(i) an outer member connected to the chassis, (ii) said outer member sloping forward and downward, and (iii) said first inner member having a first hitch thereon adapted for connection to a first towing vehicle;

comprising:

facilitating the towing of said trailer with a first towing vehicle having a high hitch platform to carry heavy weight by performing the steps of
(i) telescoping and locking the first inner member into the outer member connected to the chassis,
(ii) adjusting the undercarriage member rearward on said chassis so that more weight is placed upon the first towing vehicle, and
(iii) attaching said hitch to the high platform on said first towing vehicle, and alternatively, facilitating the towing of said trailer with a second towing vehicle having a low hitch platform to carry light weight by performing the steps of
(i) telescoping and locking said first inner member inside said outer member connected to the chassis,
(ii) adjusting said undercarriage member forward on said chassis so that less weight is placed upon said second towing vehicle, and
(iii) attaching said first hitch to the low platform of the second towing vehicle, facilitating the towing of said trailer with a third towing vehicle having a low hitch platform to carry heavy weight by performing the steps of
(i) telescoping and locking said first inner member inside said outer member connected to the chassis,
(ii) adjusting said undercarriage member rearward on said chassis so that more weight is placed upon said third towing vehicle, and
(iii) attaching said first hitch to the low platform of the third towing vehicle, and facilitating the towing of said trailer with a fourth towing vehicle having a high hitch platform to carry light weight by performing the steps of
(i) telescoping and locking said first inner member inside said outer member connected to the chassis,
(ii) adjusting said undercarriage member forward on said chassis so that less weight is placed upon said fourth towing vehicle,
(iii) attaching said first hitch to the high platform of the fourth towing vehicle.

14. The invention as defined in claim 13 further comprising:

telescoping and locking a second inner member into the outer member, said second member having a second hitch and lock thereon which is adapted for connection to said second towing vehicle.

15. The invention as defined in claim 13 wherein said undercarriage member includes two independent detachable bogies and the moving of said undercarriage includes the steps of:

lifting one side of the trailer chassis, thereby removing the weight of the trailer chassis from one of said independent longitudinally adjustable bogies on that side of the trailer, detaching the bogie on the lifted side, moving longitudinally said detached bogie to a desired position, reattaching said moved bogie, lowering said previously lifted side, thereby placing the weight of the trailer chassis on the bogie, and repeating the above steps for the other side of the trailer.

16. In a trailer having a rectangular horizontally disposed rigid chassis including
(i) longitudinal chassis members, and
(ii) transverse chassis members, a telescoping gooseneck having
(i) an outer member connected to the trailer chassis sloping forward and downward from the highest point of said outer member,
(ii) at least one inner member longitudinally slidably telescoped within said outer member,
(iii) locking means for fixing said inner member in a selected fixed position with respect to the outer member, and
(iv) hitch means for attaching said tongue to a towing vehicle attached to the bottom of said inner member, a plurality of ground engaging wheels, and a body mounted on said chassis, a portion of said body extending vertically below said longitudinal chassis members;

the improved structure for attaching said wheels to said chassis comprising in combination with the above:

two independent bogies, each having
(i) a longitudinal bogie frame member,
(ii) two short axles,
(iii) on each of said short axles, a pair of ground engaging wheels, and
(iv) spring means for connecting the axle to the bogie frame member, with
(v) the wheels straddling the bogie frame member, two coupling members each affixed to one of the longitudinal chassis members, each of said bogie frame members slidably mated to one of said coupling members, and means for locking each of said bogie frame member in a selected position to its coupling member.

* * * * *